(12) United States Patent
Garr

(10) Patent No.: US 9,549,639 B2
(45) Date of Patent: Jan. 24, 2017

(54) MANUAL BLENDER DEVICE AND METHODS

(71) Applicant: Hot Buttered Elves, Inc., Los Angeles, CA (US)

(72) Inventor: Daniel Garr, Los Angeles, CA (US)

(73) Assignee: HOT BUTTERED ELVES, INC., Los Angeles, CA (US)

( * ) Notice: Subject to any disclaimer, the term of this patent is extended or adjusted under 35 U.S.C. 154(b) by 0 days.

(21) Appl. No.: 14/754,513

(22) Filed: Jun. 29, 2015

(65) Prior Publication Data

US 2015/0374175 A1    Dec. 31, 2015

Related U.S. Application Data

(60) Provisional application No. 62/019,339, filed on Jun. 30, 2014.

(51) Int. Cl.
*A47J 43/10* (2006.01)
*A47J 43/046* (2006.01)
(Continued)

(52) U.S. Cl.
CPC ............ *A47J 43/085* (2013.01); *A47J 43/046* (2013.01); *A47J 43/1006* (2013.01);
(Continued)

(58) Field of Classification Search
CPC .... A47J 43/046; A47J 43/085; A47J 43/1006; A47J 43/1031; A47J 43/27; B01F 13/002; B01F 13/0022; B01F 2215/0022; B01F 15/0056; B01F 15/00564; B01F 15/00506
(Continued)

(56) References Cited

U.S. PATENT DOCUMENTS 1,468,826 A * 9/1923 Minney ............... A47J 43/1006
366/314
1,490,980 A * 4/1924 Minney ............... A47J 43/1006
366/205
(Continued)

FOREIGN PATENT DOCUMENTS

CN       2202484      7/1995
CN     201182529     1/2009
(Continued)

OTHER PUBLICATIONS

Notification of Transmittal of the International Search Report and the Written Opinion of the International Searching Authority, or the Declaration on corresponding International Application No. PCT/US2015/038376 dated Aug. 28, 2015 14 pages.

*Primary Examiner* — Tony G Soohoo
(74) *Attorney, Agent, or Firm* — Foley & Lardner LLP

(57) ABSTRACT

A handheld, hand-operated blender may include a container, a lid threadably connected to an upper portion of the container, a bottom portion including a stationary bottom portion threadably connected to a lower portion of the container and a rotatable bottom portion rotatable with respect to the container. The blender may also include a blade assembly including a plurality of blades and a shaft rotatably connected to the rotatable bottom portion and a gear assembly mechanically connected to the blade assembly and the rotatable bottom portion such that rotation of the rotatable bottom portion rotates the blade assembly at a faster revolution per minute than the rotation of the rotatable bottom portion.

19 Claims, 10 Drawing Sheets

(51) Int. Cl.
    *A47J 43/08*        (2006.01)
    *B01F 15/00*       (2006.01)
    *B01F 13/00*       (2006.01)
    *A47J 43/27*        (2006.01)

(52) U.S. Cl.
    CPC ........... *A47J 43/1031* (2013.01); *A47J 43/27* (2013.01); *B01F 13/002* (2013.01); *B01F 13/0022* (2013.01); *B01F 15/00506* (2013.01); *B01F 15/00564* (2013.01); *B01F 2215/0022* (2013.01)

(58) Field of Classification Search
    USPC ......................................................... 366/130
    See application file for complete search history.

(56) References Cited

U.S. PATENT DOCUMENTS

| | | | | |
|---|---|---|---|---|
| 1,580,778 | A * | 4/1926 | Coverstone | D06F 17/06 366/307 |
| 1,751,097 | A * | 3/1930 | Nelson | A61C 9/0026 164/DIG. 4 |
| 1,765,638 | A * | 6/1930 | Trynoski | A47J 43/1006 366/231 |
| 1,782,245 | A * | 11/1930 | Parkhill | A47J 43/1006 366/198 |
| 2,648,528 | A * | 8/1953 | Persak, Jr. | B67D 3/0012 366/314 |
| 2,904,808 | A * | 9/1959 | Massman | A45D 34/048 132/73 |
| 3,085,281 | A * | 4/1963 | Massman | A45D 34/048 366/130 |
| 3,820,692 | A | 6/1974 | Swett et al. | |
| 3,964,345 | A * | 6/1976 | Le Van | A47J 43/1006 366/205 |
| 4,916,672 | A * | 4/1990 | McCrory | B01F 7/00583 366/130 |
| 5,549,385 | A * | 8/1996 | Goncalves | A45D 40/0068 366/314 |
| 6,719,451 | B1 * | 4/2004 | Yue | A47J 43/27 366/130 |
| 2004/0032791 | A1 * | 2/2004 | Gauss | A47J 43/1006 366/199 |
| 2005/0105387 | A1 * | 5/2005 | Nikkhah | A47J 43/042 366/205 |
| 2008/0198691 | A1 | 8/2008 | Behar et al. | |
| 2012/0061398 | A1 | 3/2012 | Nilsson | |
| 2015/0374175 | A1 * | 12/2015 | Garr | A47J 43/085 366/130 |

FOREIGN PATENT DOCUMENTS

| | | | |
|---|---|---|---|
| CN | 201469068 | | 5/2010 |
| GB | 2304598 | A * | 3/1997 ............ A47J 43/085 |

* cited by examiner

MANUAL BLENDER DEVICE AND METHODS

RELATED APPLICATION

The present disclosure relates to and claims the priority filing date of U.S. Provisional patent application No. 62/019,339, titled "Manually-Operated Blender," filed on Jun. 30, 2014, which is incorporated herein in its entirety.

BACKGROUND

Embodiments described herein relate to manually-operated blender devices and methods of making and using the same and, in particular embodiments, to such blender devices and methods that can produce, from a manual input of force, a sufficiently high rotational speed (revolutions per minute, RPMs) for certain shredding and blending processes.

Typical blender devices for blending food products include an electric motor coupled, through a gear arrangement, to a rotatable blade held within a container. While electric motors can produce rotational motion to rotate a blade at sufficiently high RPMs to pulverize and shred many food products, such motors require a source of electric power to operate.

SUMMARY

Embodiments described herein relate to manually-operated blender devices and methods of making and using the same and, in particular embodiments, to a blender device that can be operated by holding a container portion of the blender device while manually rolling a rotatable portion of the blender device along a surface. In particular embodiments, a manual (or non-electric) blender device is configured to shred food into a drinkable liquid, using sufficiently high RPMs to produce nutritious food drinks, including protein powder mixes, fruits and berries, mixes and the like.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

DETAILED DESCRIPTION

Figure 1:
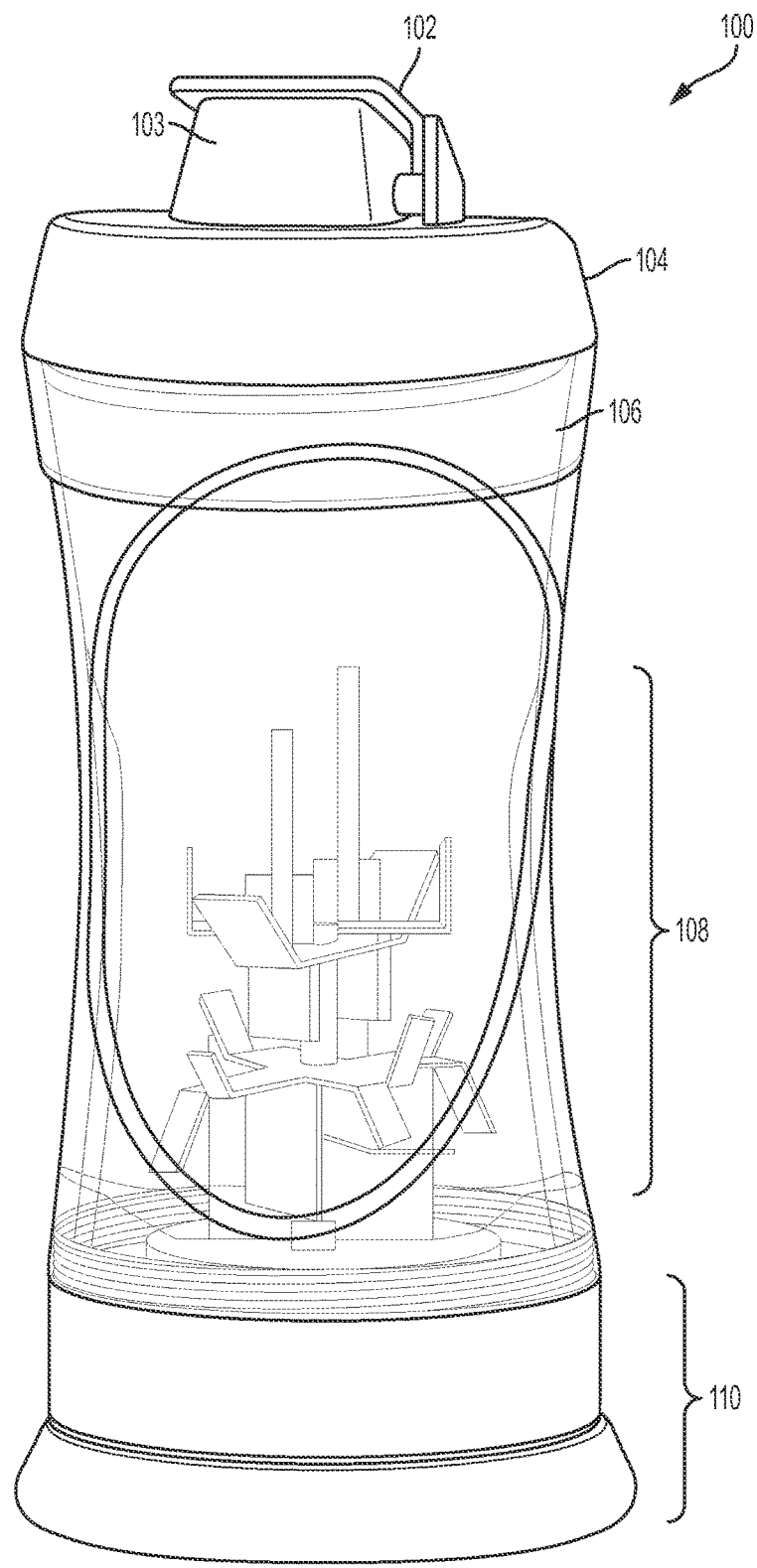
FIG. 1 is a front view of a blender, according to one embodiment.
Figure 2:
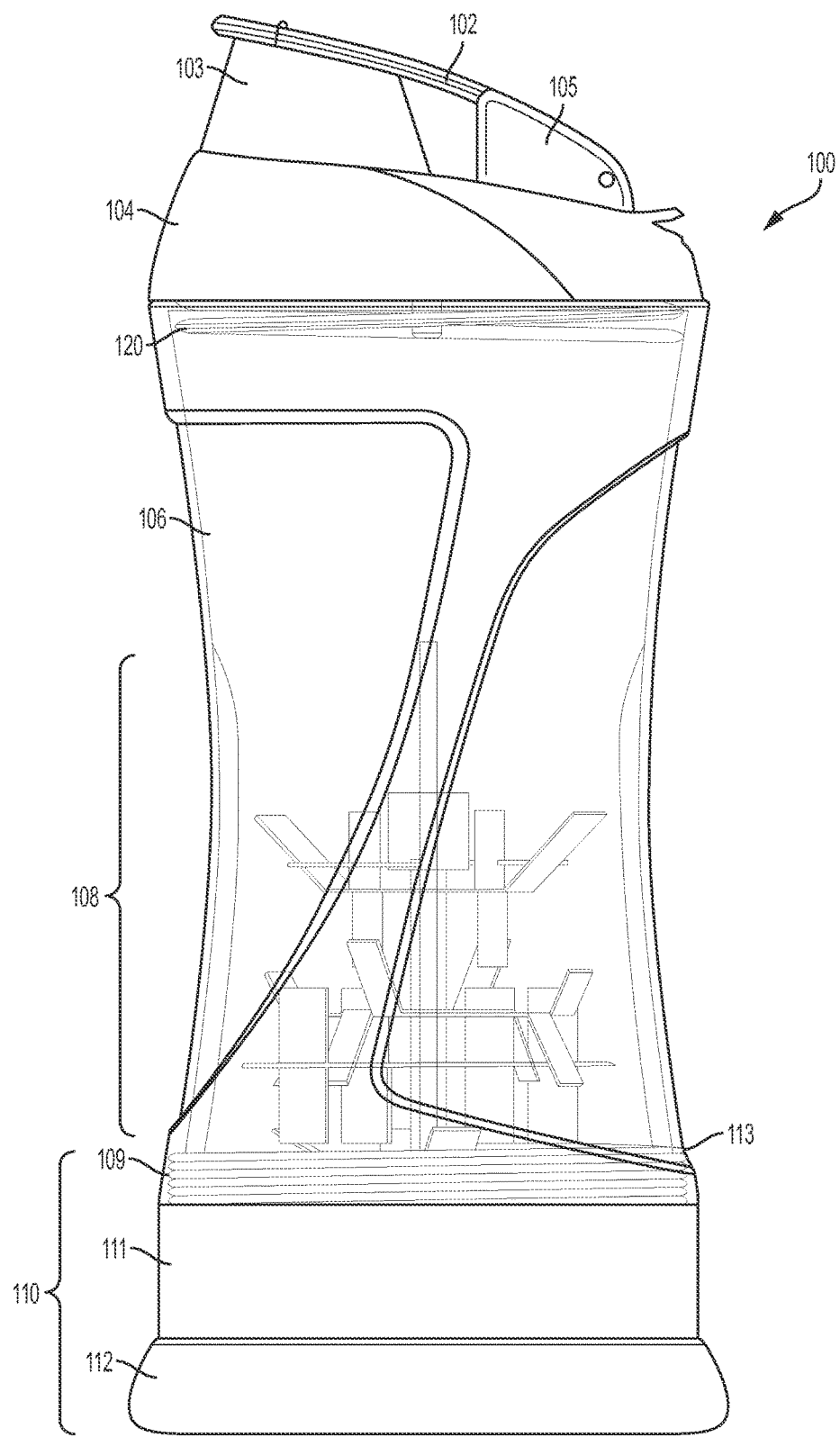
FIG. 2 is a side view of the blender of FIG. 1.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims FIGS. 1 and 2 illustrate one embodiment of a handheld blender 100. In the embodiment of FIGS. 1 and 2, the blender 100 includes a container 106, a lid 104, a blade assembly 108 and a bottom portion 110.

The bottom portion 110 of the blender 100 includes a fixed section 111 that attaches to the container 106. The bottom portion 110 also includes a rotatable section 112 that is rotatable relative to the fixed section 111, and that is operatively connected to rotate the blade assembly within the container 106. For example, a user may rotate the blade assembly 108 by holding the container 106 in one hand (or both hands, if desired) and rolling the rotatable section 112 along a surface, such as, but not limited to a table or counter top surface. In particular embodiments, the bottom portion 110 has a bottom surface that is sufficiently flat to allow the blender 100 to rest, in a stable manner, on a flat surface (such as, but not limited to, a table or counter top surface), in an upright orientation as shown in FIGS. 1 and 2.

The container 106 is configured to hold material (blend material) to be chopped, mixed, shredded or blended such as, but not limited to fruits, vegetables, nuts, grains, meats, eggs, cheese, spices, other food or food products, drinkable liquids, ice, or other edible ingredients. In further embodiments, the container 106 may hold other food or non-food materials to be shredded or blended, including, but not limited to chemical, industrial, cleaning, laboratory materials or the like, in various forms such as, but not limited to solids, granules, liquids, gels, and combinations thereof.

The lid 104 is configured to attach, in a releasable manner, to a first open end (the top end in the orientation in FIGS. 1 and 2) of the container 106. The blender 100 may include one or more releasable attachment mechanisms, such as, but not limited to screw threads, latches, friction fitted connection surfaces, or the like, for attaching the lid 104 to the container 106, in a manually releasable manner. In the embodiment of FIGS. 1 and 2, the lid 104 is configured to screw onto the top of the container 106. In that regard, the lid 104 may include one or more screw threads (not in view) that are configured to engage with a corresponding one or more screw threads 107 (FIG. 4) on the container 106.

Figure 3:
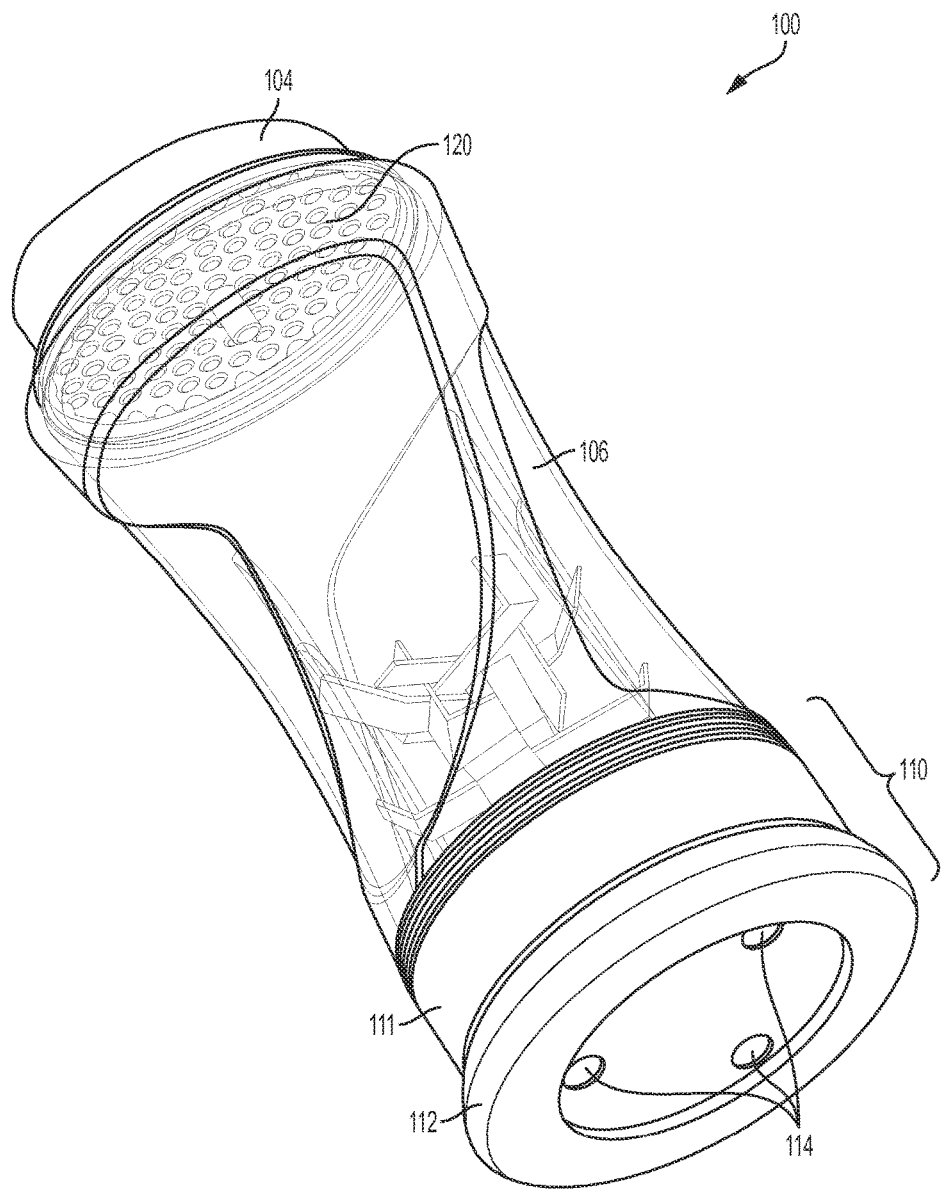
FIG. 3 is a perspective view of the blender of FIG. 1 as viewed from the bottom, according to one embodiment.
Figure 4:
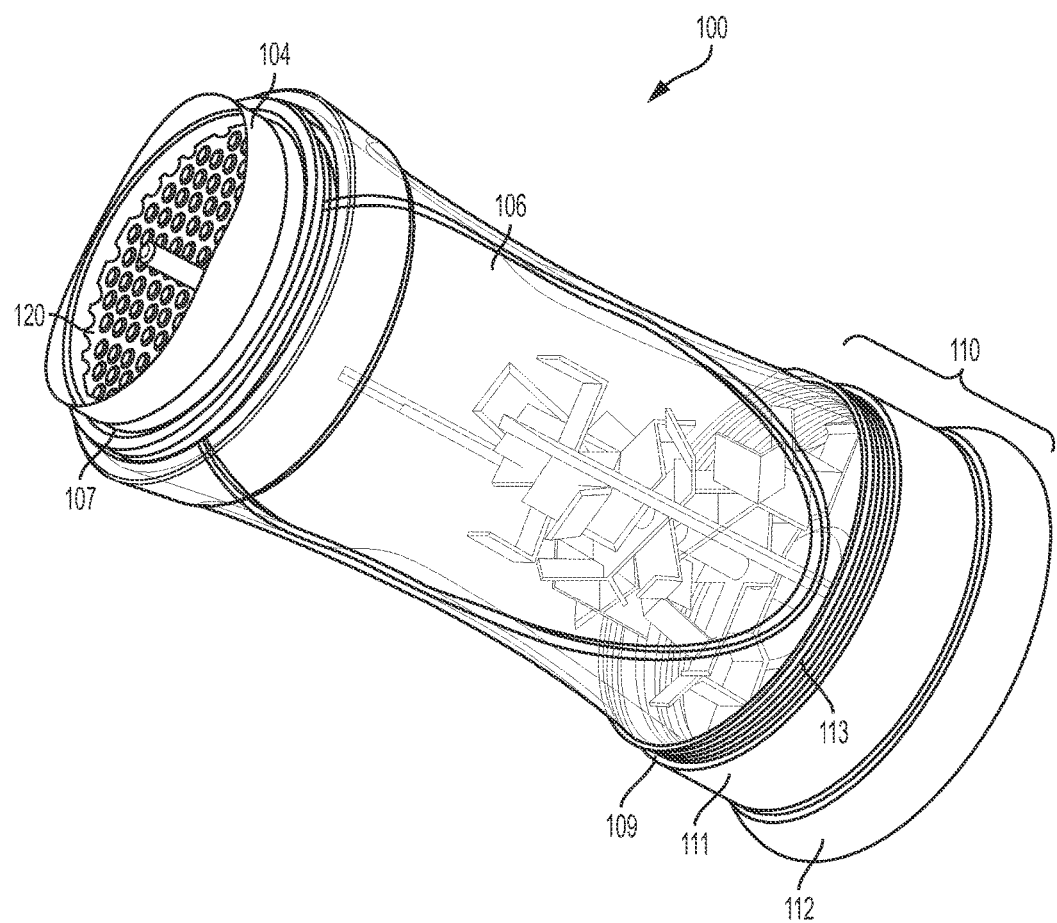
FIG. 4 is a perspective view of the blender of FIG. 1 as viewed from the top.

In the embodiment in FIG. 4, the screw threads 107 are provided on the body of the container 106, adjacent the first open end (the top end in the orientation in FIGS. 1-4) of the container 106. In the embodiment in FIG. 4, the screw threads 107 are provided on the outer surface of the body of the container 106, for engaging corresponding screw threads (not in view) on the inner surface of the body of the lid 104, where the lid 104 engages the container 106. In other embodiments, the screw threads 107 may be provided on an inner surface of the body of the container 106, for engaging corresponding screw threads on the outer surface of the body of the lid 104, where the lid 104 engages the container 106.

Referring to FIGS. 1 and 2, in particular embodiments, the lid 104 may include a spout portion, such as, but not limited to the spout portion 103, for pouring or sipping liquid directly from the interior of the container 106. In certain embodiments, the spout portion 103 may be configured to be comfortably placed directly in a user's mouth for sipping liquid or emulsified blend material directly from the container 106. In such embodiments, the blender 100 may be configured as a portable device, for a user to carry to various locations or events in a manner similar to a manner in which re-usable, portable drinking bottles, sports water bottle or the like are carried. In further embodiments, the spout portion 103 may be configured to assist with pouring liquid from the interior of the container 106 in a controlled manner. For example, the spout portion 103 may include a ridge or groove or other shape that help to guide liquid off of a particular edge of the spout portion 103, to help control the flow of liquid during a pouring operation.

The spout 103 has an opening (not in view in the drawings) that is covered by a cap 102. The spout 103 is narrower than, and has an open end that is smaller in diameter than the opening of the first open end of the container 106, for assisting a user in controlling the pouring of liquid out from the container 106. The cap 102 is configured to attach to and close the open end of the spout 103 and, be selectively removable to open the open end of the spout 103, for example, by manual force. The cap 102 may attach by a friction fit configuration in which a portion of the body of the cap 102 is friction fitted within an opening in the open end of the spout 103, but can be removed by manual force. In such embodiment, the friction fit connection can also provide a seal against leakage of liquid from the interior of the container, when the cap is friction fitted within the open end of the spout 103. In other embodiments, the cap may attach to and selectively close or open the open end of the spout 103 by other suitable attachment mechanisms including, but not limited to one or more latches, clips, or the like.

In addition, one or more seals (O rings, gaskets or other seal structures) may be provided on the cap or the spout 103 (or both), for inhibiting leakage of fluid from inside of the container 106, when the spout 103 is covered by the cap 103 and the lid 104 is on the upper portion of the container 106. In particular embodiments, the cap 102 may be secured to the lid 104 by a connection structure 105 such as, but not limited to a hinge, pivoting structure, leash, or the like, so that the cap 102 remains attached to the lid 104, when the cap 102 is attached to and closes the open end of the spout 103 (as shown in FIGS. 1 and 2), and when the cap 102 is removed from the open end of the spout 103 to open the spout 103.

The bottom portion 110 of the blender 100 may be configured to attach, in a releasable manner, to a second open end (the bottom end in the orientation in FIGS. 1 and 2) of the container 106. The blender 100 may include one or more releasable attachment mechanisms, such as, but not limited to screw threads, latches, friction fitted connection surfaces, or the like, for attaching the bottom portion 110 to the container 106, in a manually releasable manner. In the embodiment of FIGS. 1 and 2, the bottom portion 110 is configured to screw onto the bottom end of the container 106. In that regard, the fixed section 111 of the bottom portion 110 may include a generally cylindrical housing having one or more screw threads 113 that are configured to engage with a corresponding one or more screw threads 109 on the container 106.

In particular embodiments, one or more seals (O rings, gaskets or other seal structures) may be provided on the threads or other location(s) on the fixed section 111 or the lower portion of the container 106 (or both), for inhibiting leakage of fluid from inside of the container 106, when the fixed section 111 of the bottom portion 110 is attached to the lower portion of the container 106. When the bottom portion 110 is connected to the container 106, the rotatable section 112 of the bottom portion 110 can be rotated to cause rotation of a blade assembly 108. Rotation of the blade assembly 108 can chop, blend, or mix a variety of blend materials within the blender 100.

In the embodiment in FIGS. 1 and 2, the screw threads 109 are provided on the body of the container 106, adjacent the second end (the bottom end in the orientation in FIGS. 1 and 2) of the container 106. In the embodiment in FIGS. 1 and 2, the screw threads 109 are provided on the inner surface of the body of the container 106, for engaging corresponding screw threads 113 on the outer surface of the body of the fixed section 111 of the bottom portion 110, where the fixed section 111 engages the container 106. In other embodiments, the screw threads 109 may be provided on an outer surface of the body of the container 106, for engaging corresponding screw threads on the inner surface of the body of the fixed section 111, where the fixed section 111 engages the container 106. In yet other embodiments, the container 106 may be formed integrally with or attached to the bottom section 111 in a manner that inhibits disconnection of the container 106 from the bottom section 111.

Figure 10:
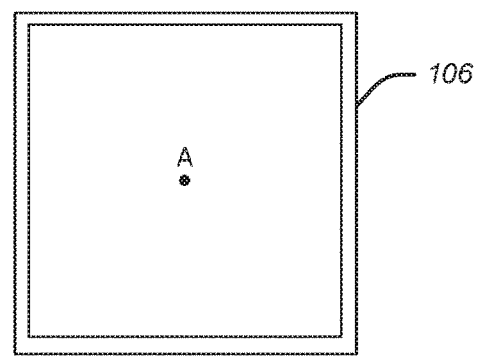
FIG. 10 is a cross-section representation of a container of a blender according to an example embodiment.

With reference to FIGS. 1 and 2, in certain embodiments, the container 106 may have a generally cylindrical shape and, in particular embodiments the container shape may be contoured such that it is wider at the top and bottom with a narrower middle portion or waist. This shape allows for a user to easily hold the blender 100 in one hand. In some embodiments, the blender 100 can have a strap (not shown) that can hold a user's hand tight against the container 106. Preferably, the contoured shape of the container 106 also titrates solid blend material (such as solid chunks of fruits, vegetables or other food) slowly into the blade assembly 108 to avoid jamming the blades. In other embodiments, the middle portion or waist of the container 106 may be wider than one or both of the top and bottom portions of the container. In other embodiments, the container 106 may have other suitable shapes including, but not limited to, a generally cylindrical shape that is generally uniform in diameter along its length (with the middle section having the same diameter as the top and bottom sections of the container 106), a square-cylindrical shape (cylindrical shape with a square cross-section), or combinations thereof (different shapes along the axial length of the container 106). For example, a container 106 having a square or other polygonal cross-section shape (cross-section taken perpendicular to the axial dimension of the container 106, as shown in FIG. 10) can be configured to slow the rotation of blend material within the container 106, so that the blend material does not move at the same speed as the blades. In particular embodiments, the blender 100, including the container 106, is desirably designed to facilitate ease of use or portability (or both).

As discussed above, the container 106 may have a threaded portion 109 such that the bottom portion 110 can be screwed onto the container 106 or vice versa. Also as discussed above, a similar threaded portion (not shown) may be provided on the upper portion of the container 106 such that the lid 104 can be screwed onto the container 106 or vice versa. For ease of assembly and cleaning, both the lid 104 and the bottom portion 110 desirably can be disconnected (such as unscrewed) from the container 106. Additionally, the bottom portion 110 and the blade assembly 108 desirably can be removed from the container 106 to facilitate cleaning of the container 106 and the blade assembly 108.

Figure 5:
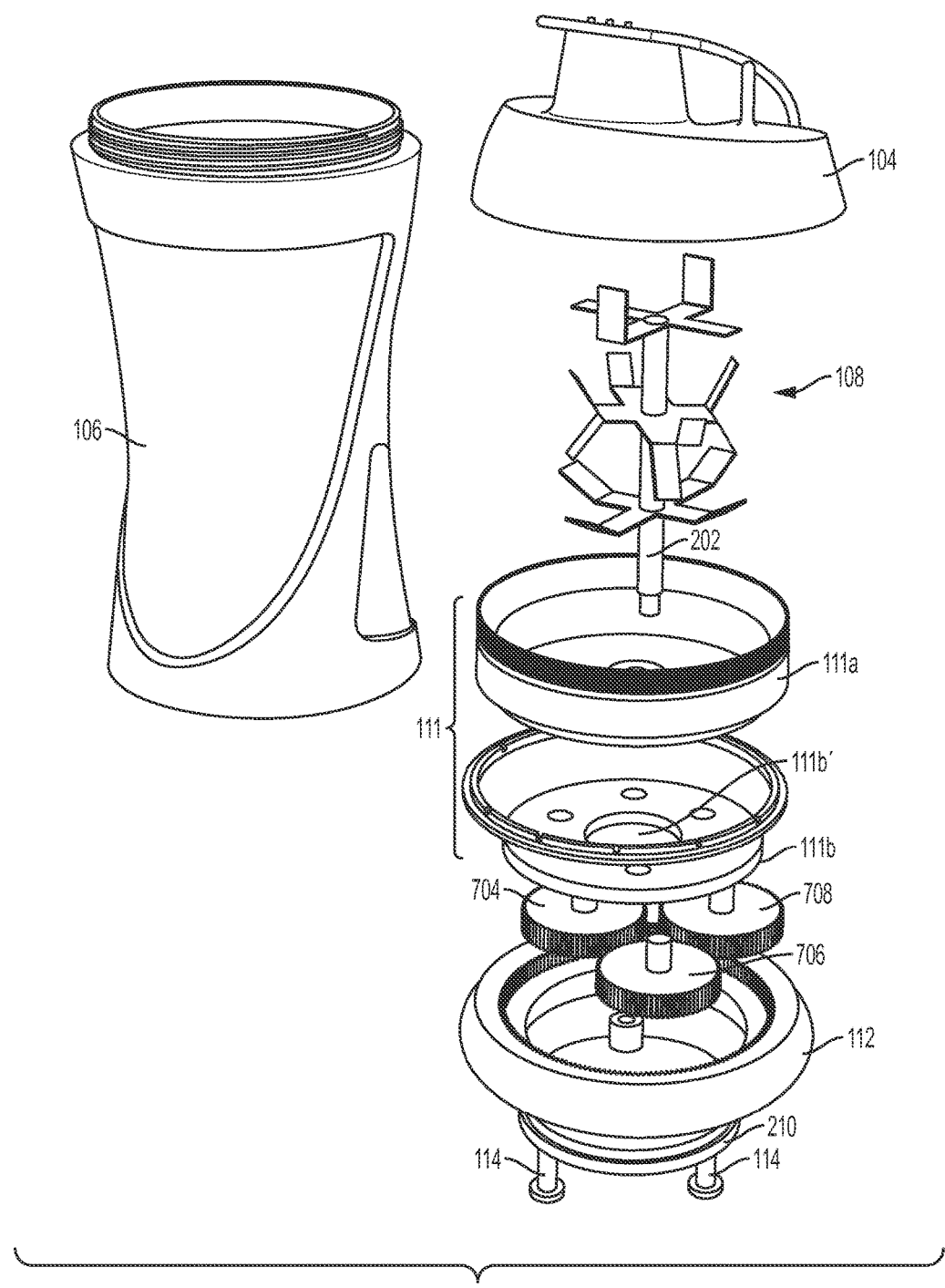
FIG. 5 is an exploded, perspective view of a blender according to a further embodiment.
Figure 6:
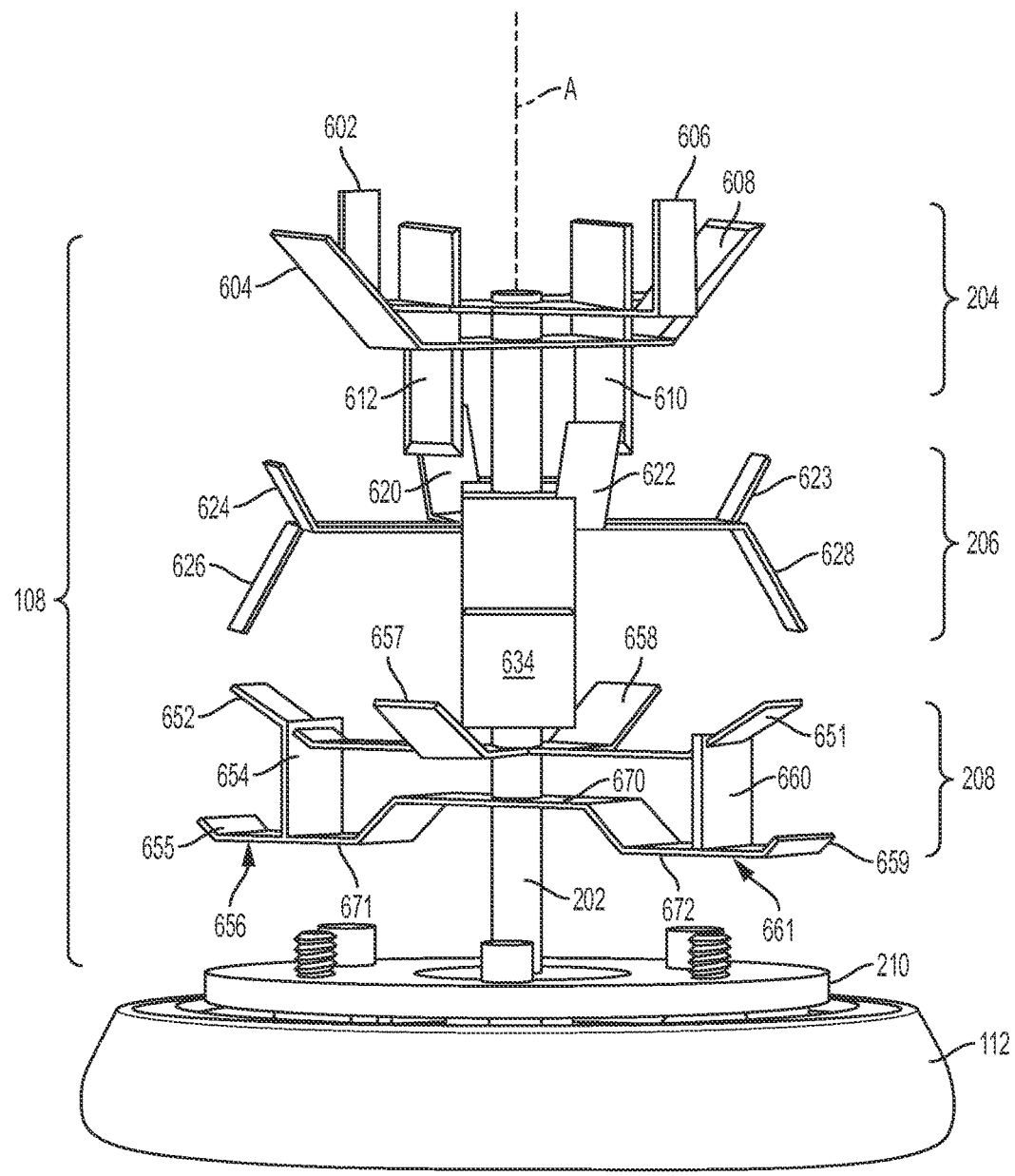
FIG. 6 is a side view of a blade system for the blender of FIG. 1, according to one embodiment.
Figure 7:
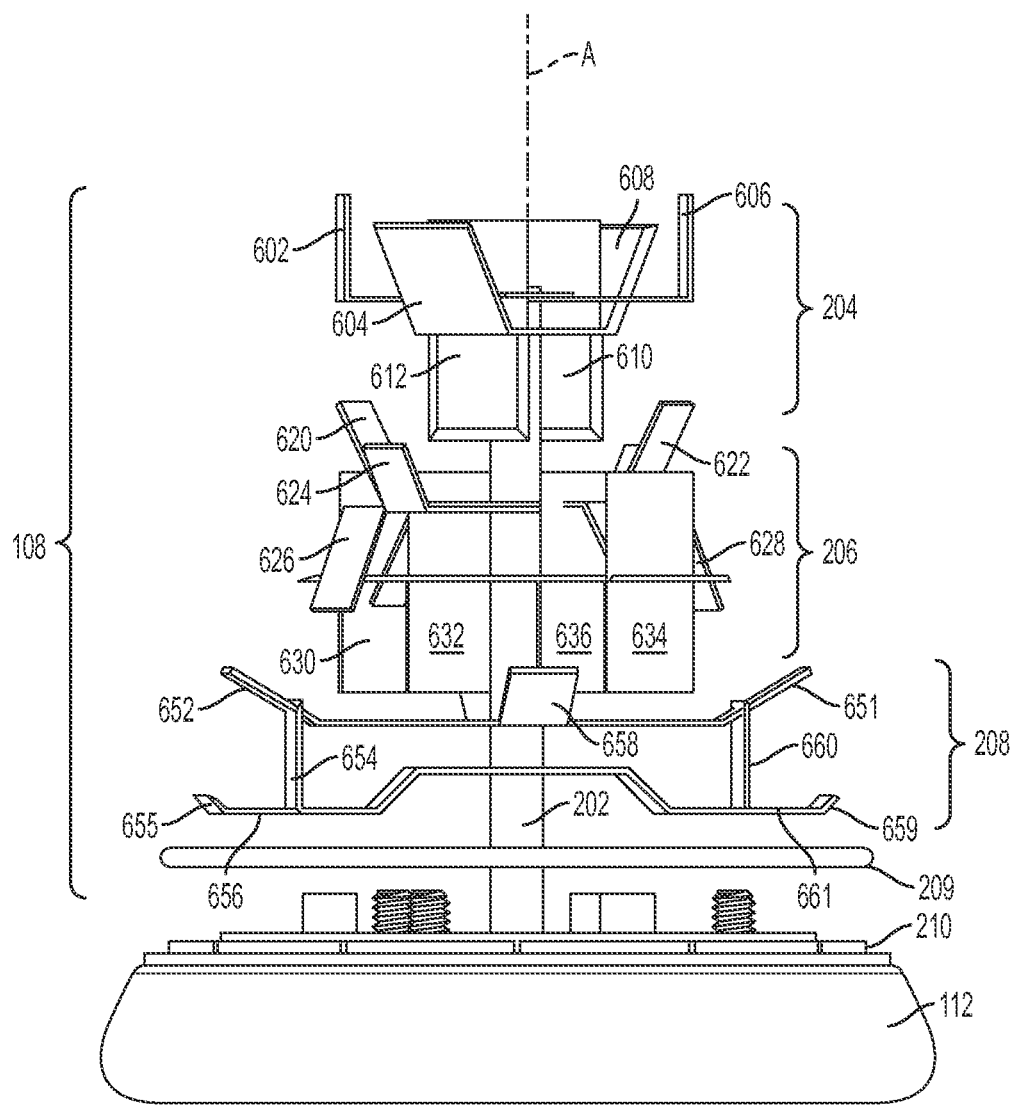
FIG. 7 is another side view of the blade system shown in FIG. 5.
Figure 8:
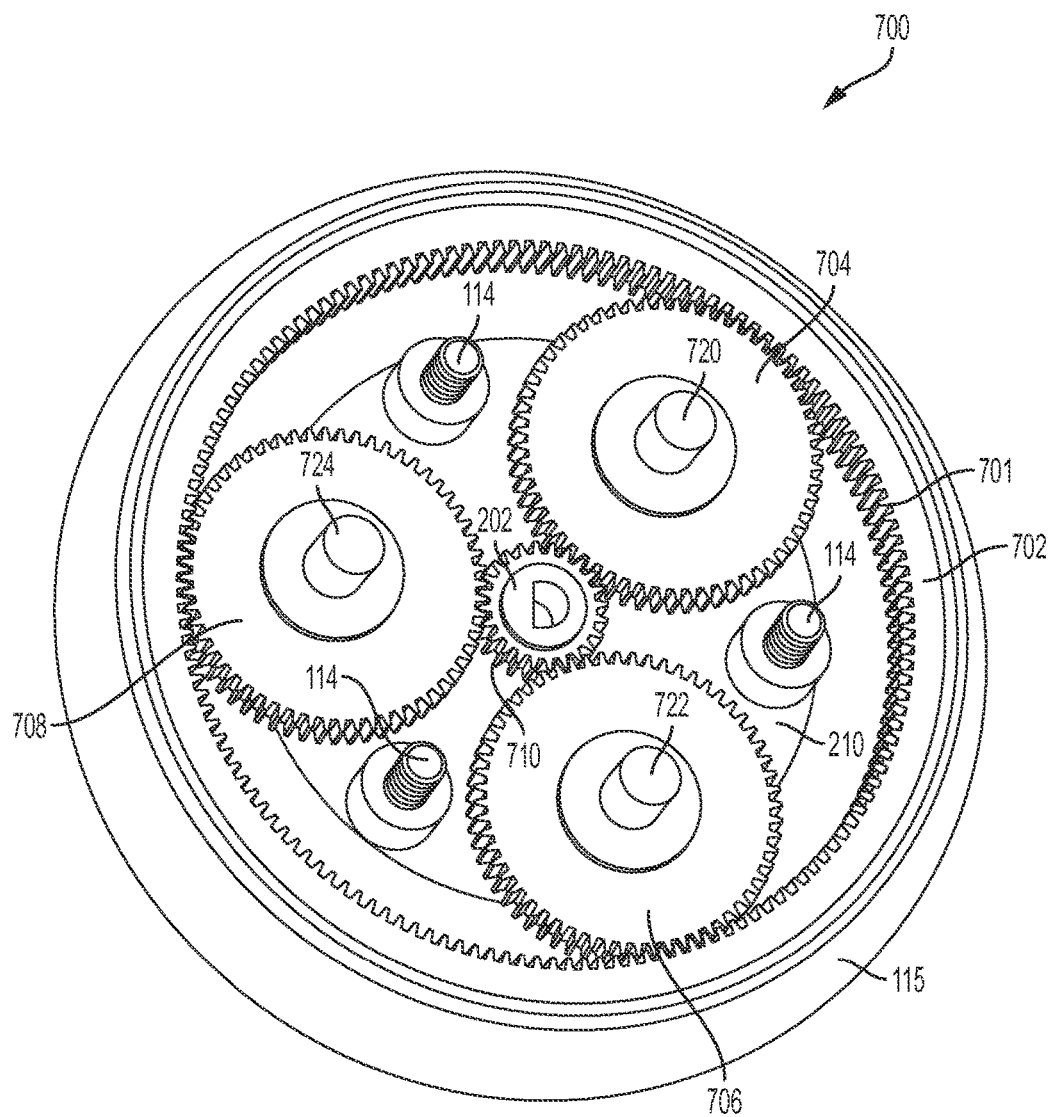
FIG. 8 is a view of a gear system for the blender of FIG. 1, according to one embodiment.

As illustrated in FIGS. 5-7, the blade assembly 108 may include a shaft 202 and a plurality of individual blade subassemblies. As described herein, the examples illustrated in the drawings include three subassemblies 204, 206 and 208 (as non-limiting examples). In other embodiments, the blade assembly 108 may include more or fewer than three blade subassemblies. Each of the blade subassemblies includes or is supported on the shaft 202, for rotation with rotation of the shaft 202. The shaft 202 extends through an opening in the fixed section 111 of the bottom portion 110, to engage the gear assembly housed within the bottom portion 110. One or more seals (O rings, gaskets or other seal structures) may be provided on the fixed section 111 or the shaft 202 (or both) in or around the opening in the fixed section 111, for inhibiting leakage of fluid from inside of the container 106, through that opening, when the fixed section 111 is attached to the lower portion of the container 106.

With reference to FIGS. 3 and 4, in some embodiments, the blender 100 may include a strainer 120. The strainer 120 may include a plate or cup-shaped body having a plurality of holes through which fluid may pass. The holes have a diameter selected to inhibit passage of particles or pieces of blend material that are larger than the hole diameter. The strainer 120 may be provided near the lid 104 to prevent large particles of food or other blend material from passing through the spout 103 (FIG. 2), from the container 106, while a user is pouring liquid out of the container 106, through the spout 103. The strainer 120 desirably allows larger pieces of food to be kept within the blender 100 for additional processing. As liquid is removed from the blender 100, the blade assembly 108 becomes more efficient at processing the larger particles as there will be less volume of liquid within the blender 100.

In particular embodiments, the strainer 120 (or a portion thereof) may be held between the lid 104 and the container 106. In such embodiments, the strainer 120 may have an outer diameter that is larger than the inner diameter of the container 106, so that the strainer 120 rests on top of the container 106 before the lid 104 is placed on the container 106. Then, when the lid 104 is threaded onto the container 106, the strainer 120 is clamped or compressed between the lid 104 and the upper end of the container 106. In another embodiment, the strainer 120 has an outward extending lip that has an outer diameter larger than the inner diameter of the container 106, such that the lip rests on the upper edge of the container 106, while the body of the strainer 120 fits partially or fully into the upper portion of the container 106. Then, when the lid 104 is threaded onto the container 106, the lip of the strainer 120 is clamped or compressed between the lid 104 and the upper end of the container 106. In yet other embodiments, the strainer 120 may be held within or on the container 106 by other suitable support structures, such as, but not limited to a shelf, ridge, rib or reduced diameter portion on the inner wall of the container 106, that is smaller in diameter than the strainer 120 (or lip of the strainer 120), such that the strainer 120 rests on which shelf, ridge, rib or reduced diameter portion, when the strainer 120 is placed within the container 106. In yet other embodiments, the strainer 120 may be friction fitted or otherwise retained by a shelf, ridge, rib or reduced diameter portion on the inner wall of the container 106.

FIG. 5 shows an embodiment of a blender 100, in an exploded view. In the embodiment of FIG. 5, components that are similar in structure and operation as components described with reference to the embodiments of FIGS. 1-4 are provided with the same reference numbers as used in FIGS. 1-4.

In the embodiment in FIG. 5, the fixed section 111 includes a cup-shaped body 111*a*, which closes the open second end of the container 106, when the blender 100 is assembled. In further embodiments, the cup-shaped body 111*a* of the fixed section 111 may be formed unitary with the container 106, or may be permanently attached to the container 106 in a manner that inhibits separation from the container 106. In the embodiment of FIG. 5, the fixed section 111 also includes a plate member 111*b* that is arranged below (in the orientation of FIG. 5) the cup-shaped body 111*a*. The plate member 111*b* includes a central opening 111*b*' through which the shaft 202 extends. One or more seals (O rings, gaskets or other seal structures) may be provided on the plate member 111*b* or the shaft 202 (or both) in or around the central opening 111*b*', for inhibiting leakage of fluid from inside of the container 106, through the central opening 111*b*', when the fixed section 111 is attached to the lower portion of the container 106.

The fixed section 111 connects with a stationary base member 210, such that the fixed section 111 remains fixed relative to the base stationary base member 210. In the embodiment of FIG. 5, the stationary base member 210 is connected to and fixed with respect to the plate member 111*b* and the cup-shaped member 111*a*, by one or more fasteners 114 (three fasteners 114 in the illustrated embodiment, arranged offset from the central axis of the shaft 202, to avoid relative rotation between the stationary base member 210 and the plate member 111*b*). For example, each fastener 114 may include a threaded portion and an unthreaded portion that is wider than the threaded portion, where the threaded portion engages and threads into threaded holes (not in view) in the bottom of the cup-shaped member 111*a* up to the wider-non-threaded portion. The non-threaded portion of each fastener 114 extends through a corresponding hole in the plate member 111*b* and through the open interior of the rotatable section 112. The rotatable section 112 is, thus, held between the stationary base member 210 and the plate member 111*b*, but allowed to rotate (about the axis of the shaft 202) relative to the stationary base member 210 and the plate member 111*b* of the fixed section 111.

The stationary base member 210 includes a receptacle 210*a* arranged in the center of the stationary base member 210, for receiving an end of the shaft 202. The receptacle 210*a* is of sufficient size and dimension to help maintain the shaft 202 stable and centrally aligned relative to the container 106, while allowing the shaft 202 to rotate relative to the stationary base member 210.

The fixed section 111 also includes a ring-shaped member 111*c* that attaches (for example, by snap fit, friction fit, adhesive or the like) to the bottom of the cup-shaped member 111*a*, to provide a relatively low-friction surface between the ring-shaped member 111*c* and the rotatable section 112. The relatively low-friction surface of the ring-shaped member 111*c* can help enhance the ability of the rotatable section 112 to rotate relative to the cup-shaped member 111*a*, without frictionally binding with the cup-shaped member 111*a*. In particular embodiments, the ring-shaped member 111*c* is made of or coated with a relatively low friction material, such as, but not limited to nylon or other suitable materials. In other embodiments, the cup-shaped member 111*a* (or the bottom of the cup-shaped member 111*a*) may be made of or coated with such low friction material, such that the ring-shaped member 111*c* may be omitted.

As described herein, the blade assembly 108 includes the shaft 202 and one or more blade subassemblies. In particular embodiments, the blade assembly 108 includes two or more (a plurality) of blade subassemblies, with each blade subassembly arranged at a different location along the length of the shaft 202, such that at least one blade subassembly is arranged above at least one other blade subassembly, on the shaft 202. In such embodiments, the number, orientation or radial length (from the shaft 202) of the blades in different blade sub-assemblies may differ. For example, a top blade subassembly (closest to the lid 104) may include blades that are shorter in radial length (from the shaft 202) than blades in a bottom blade subassembly (located below the top blade subassembly), in a blade assembly 108. In such embodiments, the radial or distal end of the longer blades (e.g., blades in the bottom blade subassembly) moves faster than the radial or distal end of the shorter blades (e.g., blades in the top blade subassembly), such that the top and bottom blade subassemblies provide different blending or chopping effects. Alternatively or in addition, the angle, orientation and shape of blades in each blade subassembly may differ from the angle, orientation and shape of blades in one or more other blade subassemblies of a blade assembly 108, to provide different blending or chopping effects. In particular embodiments, a blade assembly includes a plurality of blade subassemblies arranged along the shaft 202 in a series or stack, such that each blade subassembly in the series or stack has one or more longer blades than the next higher blade subassembly in the series or stack.

Figure 9:
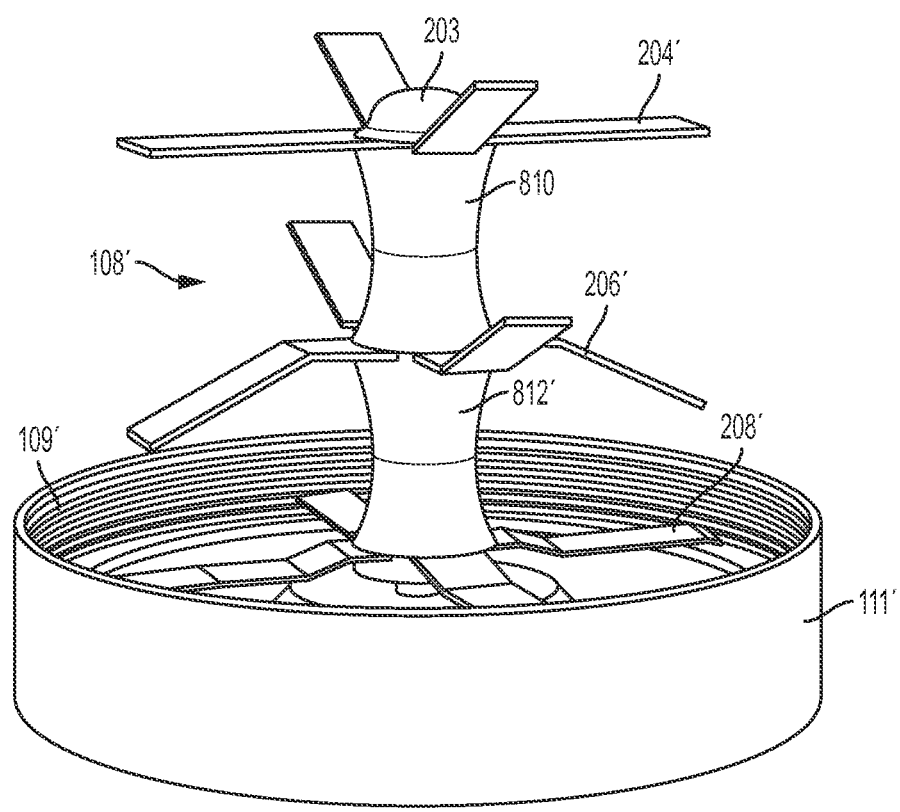
FIG. 9 is a perspective view of a portion of a blender according to a further embodiment.

In the embodiment illustrated in FIGS. 5-7, the blade assembly 108 includes the shaft 202 and three blade subassemblies 204, 206 and 208. Another embodiment of a blade assembly 108' having three blade subassemblies 204', 206' and 208' is shown in FIG. 9. As described herein, a blade assembly 108 according to other embodiments, may include other numbers and configurations of blade subassemblies, relative to those shown in FIGS. 5-7 and 9.

In one embodiment, the shaft 202 and the individual blade subassemblies 204, 206 and 208 (or 204', 206' and 208') are formed as a unitary structure or are connected together in a fixed manner, so as to rotate together as the shaft 202 is rotated. In other embodiments, the shaft 202 and the individual blade subassemblies 204, 206 and 208 (or 204', 206' and 208') are separate elements that are assembled together. In such embodiments, each subassembly may connect with an adjacent subassembly, by any suitable connection structure or mechanism. In such embodiments, each individual blade subassemblies 204, 206 and 208 includes a central opening through which the shaft 202 extends. One or both of the central opening in each blade subassembly 204, 206 and 208 and the shaft 202 is shaped (for example, with a non-round cross-section) or includes a tab or key feature, to avoid relative rotation between the blade subassembly and the shaft 202, when the shaft 202 is arranged through the central opening of the blade subassembly 204, 206 or 208. The shaft 202 may include larger diameter sections (or spacer tubes) of larger diameter than the central openings in the blade subassemblies 204, 206 and 208 may be arranged on the shaft 202, between the blade subassemblies, to support the blade subassemblies in a spaced relation relative to each other. In the embodiment of FIG. 9, spacer 810 is arranged between blade subassemblies 204' and 206', while a second spacer 812 is arranged between blade subassemblies 206' and 208'.

The upper end of the shaft 202 (with respect to the orientations shown in FIGS. 1-7 and 9) may include a cap 203 may have a larger diameter than the central openings in the blade subassemblies 204, 206 and 208 (or 204', 206' and 208') or be otherwise configured to retain the blade subassemblies 204, 206 and 208 (or 204', 206' and 208') on the shaft 202. In particular embodiments, the cap 203 may be attached to an end of the shaft 202 in a removable manner, to allow the cap to be removed so that the blade subassemblies 204, 206 and 208 (or 204', 206' and 208') can be removed from the shaft 202, for example, for cleaning, replacement, repair, or the like.

Each of the individual blade subassemblies 204, 206, 208 (or 204', 206' and 208') may include a number of surfaces or blades oriented at various angles with a vertical axis A defined by the shaft 202. Because a hand-powered blender generally cannot be rotated as quickly as a motor-powered blender, the surface area of the cutting edges of the blade assembly 108 is increased through the use of multiple blade sub-assemblies 204, 206, 208 (or 204', 206' and 208') or multiple blades on each blade sub-assembly (or both).

The blade assembly 108 in the illustrated embodiments includes three blade subassemblies 204, 206 and 208 (or 204', 206' and 208'). In such embodiments, each of the three blade subassemblies 204, 206 and 208 (or 204', 206' and 208') may be arranged and configured to provide a particular operation, including the top blade 204 (or 204') for grabbing and pulling food down from the upper end of the container 106, the middle blade 206 (or 206') for cutting and rough shredding, and the bottom blade 208 (208') for fine shredding and liquefying. In other embodiments, each blade assembly may be configured for different or combined operations as discussed above.

In further embodiments, the blade assembly may include fewer blade subassemblies (such as one or two blade subassemblies), for example, to reduce manufacturing cost. In yet further embodiments, the blade assembly may include more than three blade subassemblies. In yet further embodiments, the bender device 100 includes two or more replaceable blade assemblies 108, each having a different number of blade subassemblies or a different blade configuration for different blending operations (for example, different blade subassemblies configured for different mixing, chopping, shredding, blending, liquefying, kneading, ice crushing or other operations), where the user may select and install a desired blade subassembly and replace blade subassemblies as needed or desired.

In the embodiment of FIGS. 1-7, the blade assembly 108 includes the three blade subassemblies 204, 206 and 208, assembled from top to bottom along the shaft 202. As discussed above, the top blade subassembly 204 closest to the lid 104 is configured to grab food from the top of the blender 100 near the lid 104 and pull the food further down the body of the container 106. The blade subassembly 204 is comprised of a number of individual blades 602, 604, 606, 608, 610, and 612, as shown in FIG. 6. The blades 602, 604, 606, 608, 610, and 612 are desirably oriented at different angles to one another and are desirably distributed approximately equally around the circumference of the shaft 202. In one embodiment, the blades 602 and 606 are oriented approximately 180 degrees apart on the shaft 202 and together form a "U" shape. Additional blades 604 and 608 may each be oriented at approximately a 45 degree angle from the vertical axis A defined by the shaft 202 and may be located radially distal from the shaft 202 than the blades 602, 606. The blades 604 and 608 may be oriented approximately 180 degrees apart on the shaft 202. The blades 610 and 612 may also be oriented approximately 180 degrees apart on the shaft 202. The blades 610, 612 may be located closer to the shaft 202 than the blades 602, 606, 604, and 608 and may be parallel to the vertical axis A defined by the shaft 202. The orientation of the blade sub-assembly 204 such that the 45 degree-angled blades 604, 608 are the most distal from the shaft 202 allows food to be pulled from the top of the blender 100 near the lid 104 and chops the food into smaller pieces so that the food can pass down into the second blade subassembly 206. To further assist with pulling food downward, one or more of the blades 602, 604, 606, 608, 610, and 612 may be bent or angled along its length, in a propeller-like shape, in a direction to force blend material downward, similar to a manner in which a propeller forces fluid in a defined direction. In yet further embodiments, the blade sub-assembly 204 may have a plurality of blades having shapes or arrangements different from that of blades, 602, 603, 606, 608, 610 and 612, but otherwise shaped and oriented (with bends or angles along their lengths) in a propeller-like shape, in a direction to force blend material downward.

The middle blade subassembly 206 is also desirably comprised of a plurality of individual blade surfaces. Preferably, the blade subassembly 206 has more blade surfaces and multiple bends at the tip of each blade than the top blade subassembly 204. In one embodiment, as shown in FIGS. 5 and 6, the middle blade subassembly 206 may include blade surfaces 620, 622, 623, 624, 626, 628, 630, 632, 634, and 636. Preferably, the blade subassembly 206 is approximately symmetrical about the axis A; therefore, some blade surfaces of the blade subassembly 206 may not be shown in FIG. 6. The blade surfaces 620, 622, 623, 624, 626, 628, 630, 632, 634, and 636 may be oriented at different angles with the axis A and may be located at different radial positions from the axis A In one embodiment, the blades 620, 622 may form a pair such that the blades 620, 622 are located approximately 180 degrees radially apart on the shaft 202. The blades 620, 622 may be angled upward and outward such that the blades 620, 622 are angled upward and away approximately 45 degrees from the axis A As shown in FIG. 5, the blades 620, 622 may be located radially closer to the shaft 202 than the other blades of the middle blade subassembly 206. The blades 624, 626, 623, 628 may form a pair such that the blades 624, 626 are approximately 180 degrees radially apart from the blades 623, 628 on the shaft 202. Two of the blades, 624, 623, may be angled upward and outward from the shaft 202, while the other two blades 626, 628 are angled downward and outward from the shaft 202. As illustrated in FIGS. 5 and 6, the orientation of the blades 624, 626 and 623, 628 may form a "split bend" such that the end of a single blade surface connected to the shaft 202 is "split" at the end such that one end (624, 623) tilts upward and the other end (626, 628) tilts downward. The blades 623, 624, 626, and 628 may be located radially further from the shaft 202 than the other blades of the middle blade subassembly 206. Blades 630, 632, 634, and 636 may be oriented parallel with the axis A and may be located at a radial distance from the shaft 202 between the blades 620, 622, and the blades 623, 624, 626, and 628. The blades of the middle blade subassembly 206 rotate more quickly than the blades of the top blade subassembly 204 to cut or shred the food pieces passed down to these blades from the top blade subassembly 204.

FIGS. 5 and 6 also illustrate the third or bottom blade subassembly 208. Preferably, the bottom blade subassembly 208 desirably has the longest blades of the three blade subassemblies 204, 206, 208 and the blades of the bottom blade subassembly 208 shred the smallest food particles into even smaller particles. The bottom blade subassembly 208 may be comprised of a plurality of interconnected blades. The blades 657, 658 may form a pair of blade surfaces that are approximately 180 degrees radially apart on the shaft 202. Blades 651, 652, 654, 655, 656, 659, 660, 661 may form an interconnected blade as best shown in FIG. 5. The blades 651, 652 may be angled upward and outward from the axis A. Blades 656, 661 may form a wave shape that includes a raised flat surface 670 that slopes down and away on either side to second and third flat surfaces 671, 672. The flat surfaces 671, 672 may transition to upward bends 655, 659 at the tips of the blades 656, 661. A vertical blade surface 654, 660 may interconnect the blades 652, 651 with the blades 656, 661 as shown. The plurality of blade surfaces shown provide a large number of cutting surfaces to finely shred or liquefy food particles to produce a smooth, blended liquid from solid food. Preferably, the bottom blade subassembly 208 has the fastest rotational speed of any of the three blade subassemblies 204, 206, 208.

In one embodiment, the shaft 202 and the blade subassemblies 204, 206, 208 are rotated by rotating the rotatable portion 112 at the bottom of the blender 100. As illustrated in FIG. 7, the rotatable portion 112 includes a gripper 115 and a rolling wheel 702. The gripper 115 and rolling wheel 702 are rotated by manually turning the rotatable portion 112 of the blender 100 either by hand by gripping the gripper 115 or by engaging the gripper 115 with a surface such as, but not limited to, a table or countertop surface, and moving the blender in a line or arc.

The gripper 115 includes an annular body having an outer surface for engaging surface, such as, but not limited to a table or countertop surface, or the like, or for being gripped by a user's hand. In particular embodiments, the outer surface of the annular body of the gripper 115 has a diameter that is larger than the outer diameter of the fixed section 111 of the bottom portion 110, or larger than the outer diameter of the lower portion of the container 106 (or both), such that the gripper 115 extends radially outward from the bottom portion 110 or the lower portion of the container 106 (or both). With the gripper 115 protruding outward, relative to the outer surface(s) of the bottom portion 110 or the lower portion of the container 106 (or both), a user may easily hold the container 106 in one hand, apply the outer surface of the gripper 115 to a rolling surface (a surface of a table or counter or other suitable surface on which the gripper can be rolled), and roll the gripper 115 along the rolling surface by moving the container 106 in a direction along the surface (without rotation of the container 106). The container 106 may be held above (or adjacent) the rolling surface, while the gripper 115 is rolled along the rolling surface. In another embodiment, the rotational portion 112 has an outer diameter that is smaller or equal to the outer diameter of the fixed section 111 and may have a dimension suitable for fitting into a standard cup holder receptacle, while also providing the capability of being rolled on a rolling surface as described herein. Alternatively, or in addition, the gripper 115 may be gripped by one hand of a user, while the other hand of the user grips the container 106 and, then the gripper 115 and the container 106 may be manually rotated relative to each other, by hand.

The wheel 702 includes an annular body that is fitted, adhered to, fastened to or otherwise fixed to the gripper 115, within the inner diameter of the gripper 115, such that the wheel 702 rotates with the gripper 115. In further embodiments, the wheel 702 may be integrally formed with the gripper 115. The annular body of the wheel 702 has gear teeth 701 extending radially inward from an inner diameter of the wheel 702. The annular body of the gripper 115 and the annular body of the wheel 702 are arranged coaxial with each other and with the shaft 202.

In particular embodiments, the gripper 115 desirably is composed of or includes an outer layer or coating of a material for enhancing friction between the gripper 115 and a surface (such as, but not limited to, a table or counter top surface). Such material may include, but is not limited to, rubber, silicone, TPR, pliable plastic, woven cloth, or the like. In other embodiments, the outer surface of the gripper 115 may include a pattern of ribs, grooves, ridges, raised portions or indentations configured to enhance friction. In yet other embodiments, the gripper 115 includes a combination of surface patterns and materials for enhancing friction. For example, a material or surface pattern (or both) for the gripper 115 (or coating or layer therefor) may be selected as having a coefficient of friction between the gripper 115 and a surface (such as a glass, granite or wood counter or table) that causes rotation of shaft and blades of the blender about the axis of rotation axis defined by the shaft. Desirably, the coefficient of friction or resilience between the gripper 115 and the surface will be large enough to generally cause the shaft and blades to rotate rather than allow the gripper 115 to skid or slide along the surface. The rotatable portion 112 is mechanically connected to a stationary base plate 210 of the blender 100 by fasteners 114.

A plurality of gears are rotatably connected to the base plate 210. FIG. 7 illustrates an example of a gear assembly 700 that may be used to rotate the shaft 202 of the blender 100. As discussed above, the rotatable portion 112 of the bottom section 110 includes the gripper 115 and the rolling wheel 702. The rolling wheel 702 is a "power wheel" that is part of a planetary gear system that rotates the shaft 202 and the blade subassemblies 204, 206, 208. The rolling wheel 702 comprises a plurality of teeth 701 that are desirably oriented inward toward the shaft 202. A plurality of planetary gears 704, 706, 708 are rotatably mounted on shafts 720, 722, 724 disposed radially around the shaft 202. The shafts 720, 722, 724 are mounted on the base plate 210. The planetary gears 704, 706, 708 are mounted approximately equidistant from each other radially around the shaft 202. Each of the planetary gears 704, 706, 708 has teeth that are configured to mesh or engage with the teeth of the rolling wheel 702. Preferably, the rolling wheel 702 has a larger diameter than each of the planetary gears 704, 706, 708 such that the plurality of sun gears can fit and rotate within the circle defined by the rolling wheel 702. In some embodiments, the rolling wheel 702 has 144 teeth. The planetary gears 704, 706, 708 are preferably identical and in some embodiments each of the planetary gears 704, 706, 708 may have 60 teeth. In some embodiments, a gear ratio between the rolling wheel 702 and each of the planetary gears 704, 706, 708 may be approximately 1:2.4 such that a single rotation of the rolling wheel 702 results in 2.4 revolutions of each of the planetary gears 704, 706, 708.

The shaft 202 is mounted within a shaft or sun gear 710 such that rotation of the shaft gear 710 causes rotation of the shaft 202. The teeth of the shaft or sun gear 710 are configured to mesh or engage with the teeth of each of the planetary gears 704, 706, 708 such that rotation of the planetary gears 704, 706, 708 induces rotation of the shaft or sun gear 710. In some embodiments, the shaft or sun gear 710 has a smaller diameter than each of the planetary gears 704, 706, 708. In some embodiments, the shaft or sun gear 710 may have 24 teeth. In some embodiments, a gear ratio between each of the planetary gears 704, 706, 708 and the shaft or sun gear 710 is approximately 1:2.5 such that a single rotation of each of the planetary gears 704, 706, 708 results in 2.5 revolutions of the shaft or sun gear 710.

As discussed above, the gear ratio between the rolling wheel 702 and each of the planetary gears 704, 706, 708 is approximately 1:2.4 and the gear ratio between each of the planetary gears 704, 706, 708 and the shaft or sun gear 710 is approximately 1:2.5, leading to an overall compound gear ratio between the rolling wheel 702 and the shaft or sun gear 710 of 1:6, which is calculated by multiplying each of the individual gear ratios together. Therefore, each single rotation of the rolling wheel 702 results in 6 rotations of the shaft or sun gear 710 and the shaft 202. As a result, in the illustrated embodiment, a single rotation of the rotatable portion 112 spins the blade assembly 108 6 times.

The embodiments illustrated in FIG. 7 result in a 1:6 overall compound gear ratio, as discussed above. However, in other embodiments, the rolling wheel 702, the planetary gears 704, 706, 708, and the shaft or sun gear 710 may have more or fewer teeth or may have a greater or lesser diameter. In other embodiments, the overall compound gear ratio between the rolling wheel 702 and the shaft or sun gear 710 may be approximately 1:3, 1:4, 1:5, 1:7, 1:8, 1:9 or any fraction in between.

With continued reference to FIG. 7, the gripper 115 may be comprised of a rubber or rubber-like material that has a soft, pliable feel that is easy to grip by hand. The rubber surface of the gripper 115 also has a texture that can grip a countertop or table surface so that the coefficient of friction or resilience between the gripper 115 and the surface desirably prevents the blender 100 from sliding along the surface and movement of the gripper 115 along the surface rotates rotatable portion 112 and the rolling wheel 702, causing the shaft 202 to spin the blade assembly 108.

The embodiments discussed above with respect to FIGS. 1-7 produce high torque without electricity and without requiring a separate hand crank, pull string, or vertical crank lever on the outside of the blender 100. In some embodiments, rotation of the rotatable portion 112 can result in approximately 3200 RPMs (revolutions per minute) of the blade assembly 108. In some embodiments, an average of 2500 RPMs of the blade assembly 108 may be achieved by rotating the rotatable portion 112. In other embodiments, the blade assembly 108 may rotate between 1500 and 3500 RPMs and between 1700 and 3200 RPMs. In some embodiments, the blade assembly 108 rotates with an average of at least 1700 RPMs, at least 1800 RPMs, at least 1900 RPMs, at least 2000 RPMs, at least 2250 RPMs, at least 2500 RPMs, or at least 2700 RPMs.

Embodiments of the blender 100 may be configured for a variety of applications and uses, including, but not limited to:

Blending powder protein shakes;
Blending fruit smoothies having a variety of ingredients such as berries (strawberries, blueberries, raspberries, blackberries), bananas, peanut butter, etc.;
Chopping nuts—such as cashews, peanuts, etc. or other softer nuts;
Chopping watermelon into a juice drink;
Juicing;
Blending ice cream and milk with or without other ingredients (such as, but not limited to cookies, brownies, nuts, chocolate sauce, or the like) for milk shakes;
Making salsas;
Mixing, blending and pouring pancake batter;
Scrambling and pouring eggs, including adding products such as ham, onions, etc.;

Mixing salad dressing components, such as spices, vinegar, oil, garlic and vegetables;

Making sauces, such as teriyaki, barbeque, and fruit sauces.

Blending alcoholic beverages, including added products such as mint, lemon, fruit, etc., followed by ice, where the resulting combination can be shaken in the container 106 like a tumbler;

Churning butter, whipping cream into butter, including adding other products, such as honey, seasoning and spices;

Shredding or grinding spices and herbs.

In other embodiments, the gear assembly 700 discussed above may be used in other contexts in which a rotational motion is required to grind, mix or produce a material. In other embodiment, the gear assembly 700 may be used to generate electrical current, for example, in a battery charging device wherein rotation of the gear assembly can rotate a rotor of a rotor/stator electrical generator and the electrical energy is then stored in capacitors or a rechargeable battery for use in a flashlight, power tool, handheld electronics, etc.

Each of the components of the blender device 100 described herein is composed of a material that provides sufficient rigidity and strength to provide the mechanical structure and operations described herein. For example, each of the cap 104, the container 106, the generally cylindrical housing of the fixed section 111 (or the cup-shaped member 111a and the plate member 111b of the fixed section 111), the bottom portion 110, the strainer 120, the gripper 115, the base plate 210, the wheel 702, the blade assembly 108 (or blades of the blade assembly 108), and the gears and shafts described herein may be made of any suitable materials such as, but not limited to plastic (such as, but not limited to reinforced injection molded plastic or softer plastic), metal, ceramic, composite material, or combinations thereof. In particular embodiments, one or more of the blade assembly 108, strainer 120, shaft 202 and gears described herein are made of metal, such as, but not limited to, stainless steel. In other embodiments, one or more of the blades of the blade assembly 108 is made of plastic. In particular embodiments, the container 106 is made of a plastic (such as, but not limited to ABS, PETE, HDPE, V, LDPE, PP, PS or TRI-TAN), glass or other ceramic material, and is at least partially transparent or translucent, such that blend material within the container 106 may be viewed from outside of the container 106. In other embodiments, the container 106 is made of metal, such as, but not limited to, stainless steel, aluminum, tin, copper, or the like.

While the embodiments shown in FIGS. 1-9, include a container 106 and lid 104 as described herein, in other embodiments, the container 106 or the lid 104 (or both) may have a different shape or configuration than those illustrated in FIGS. 1-9. For example, in further embodiments, the container 106 or lid 104 (or both) may be made of a suitable material, shape and configuration to enhance portability of the blender 100. In such further embodiments, the container 106 or lid 104 (or both) may be made of a durable plastic or metal material that is relatively light in weight and sufficiently rigid to maintain its shape, such as, but not limited to plastics or metals used for conventional portable drinking bottles. In such further embodiments, the lid 104 may include a spout 103 that is configured for a user to sip blend material directly from the container 106, for example, similar to sipping spouts (closable or non-closable), such as used on conventional portable drinking bottles. In other embodiments, the container 106 may be made of a suitable material, shape and configuration to enhance usage of the blender 100 in kitchen or other environments in which the blender is not likely to be carried large distances, but may be displayed, stored or used on a table or counter top, or the like. In such other embodiments, the container 106 or lid 104 (or both) may be made of a durable glass or other ceramic, plastic, metal or the like, and may include a decorative or stylized appearance suitable for display. In such other embodiments, the lid 104 may include a spout 103 that is configured as a pour spout for pouring blend material from the container 106 into, for example, cups, glasses or other containers or vessels. In yet other embodiments, the container 106 and lid 104 may be made of a suitable material, shape and configuration to enhance usage of the blender 100 in other manners or environments of use.

In additional embodiments, a blender 100 may be provided in the form of a kit or set, that includes a bottom portion 110 and two or more (a plurality of) containers 106 or lids 104 (or of both). In such additional embodiments, any one of the containers or lids (or both) can be individually selected from the plurality of containers 106 or lids (or both), for attachment to the bottom portion 110. In such additional embodiments, each of the containers or lids (or both) of the plurality of containers 106 or lids 104 (or both) may be made of a suitable material, shape and configuration to enhance usage of the blender 100 in a manner or environment of use different from each of the other containers or lids (or both) of the plurality of containers or lids (or both). For example, in particular embodiments, a plurality of containers 106 and lids 104 in a blender kit or set may include a first container 106 and a first lid 104 configured, as described herein, to enhance portability of the blender 100, while a second container 106 and a second lid 104 are configured, as described herein, to enhance usage of the blender 100 in kitchen or other environments in which the blender is not likely to be carried large distances, but may be displayed, stored or used on a table or counter top. In other embodiments, a plurality of containers 106 or lids 104 in a blender kit or set may include one or more alternative or additional containers or lids configured to enhance usage in other designated manners or environments.

In further embodiments, in addition or as an alternative to a blender kit or set having a plurality of containers 106 or lids 104 (or both), a kit or set for a blender 100 according to further embodiments may include two or more (a plurality of) blade assemblies 108. In such additional embodiments, any one of the blade assemblies can be individually selected from the plurality of blade assemblies 108, for attachment to the bottom portion 110. In such additional embodiments, each of the blade assemblies in the plurality of blade assemblies 108 may be made of a suitable material, shape and configuration to enhance usage of the blender 100 in a manner or environment of use different from each of the other blade assemblies of the plurality of blade assemblies 108. For example, in particular embodiments, a plurality of blade assemblies 108 in a blender kit or set may include a first blade assembly configured, as described herein, to enhance liquefying of blend material, while a second blade assembly in the plurality of blade assemblies 108 is configured to enhance course chopping, grinding or shredding, for example, but not limited to, grinding of spices or shredding of herbs. In other embodiments, a plurality of blade assemblies in a blender kit or set may include one or more alternative or additional blade assemblies configured to enhance usage in other designated manners or environments.

Although the above assemblies have been disclosed in the context of certain embodiments and examples, it will be understood by those skilled in the art that the present disclosure extends beyond the specifically disclosed embodiments to other alternative embodiments and/or uses and obvious modifications and equivalents thereof. In addition, while several variations of the blender have been shown and described in detail, other modifications, which are within the scope of the present disclosure, will be readily apparent to those of skill in the art. For example, a different gear assembly and/or alternate torque transmission components can be included.

Thus, for example, while blender device embodiments that operate with a manually rotatable gripper 115 (arranged to be rolled along a surface, such as, but not limited to a table or counter top surface) are described, in other embodiments, a device with a manually rotatable gripper 115 for rotating a shaft 202 may be configured to provide other operations, such as a battery charging operation (where a rechargeable battery is held within a container (such as a variation of the container 106) and electrically connectable to an electrical coil within the device. In such embodiments, the rotatable shaft 202 is configured to rotate a set of magnets relative to the electrical coil, to induce a charge in the electrical coil, for charging the battery. In other embodiments, the rotatable motion (with relatively high RPM) provided by the gripper 115 configuration can be employed for other uses.

For expository purposes, the term "lateral" as used herein is defined as a plane generally parallel to the plane or surface of the floor of the area in which the device being described is used or the method being described is performed, regardless of its orientation. The term "floor" floor can be interchanged with the term "ground." The term "vertical" refers to a direction perpendicular to the lateral as just defined. Terms such as "above," "below," "bottom," "top," "side," "higher," "lower," "upper," "upward," "over," and "under," are defined with respect to the horizontal plane.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally perpendicular" can refer to something that departs from exactly parallel by less than or equal to 20 degrees.

Although certain embodiments and examples have been described herein, it will be understood by those skilled in the art that many aspects of the blender shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

What is claimed is:

1. A blender comprising:
    a container;
    a lid connected to an upper portion of the container;
    a bottom portion connected to a lower portion of the container, the bottom portion comprising a rotatable section rotatable with respect to the container;
    a blade assembly comprising at least one blade rotatably connected to the rotatable section of the bottom portion; and
    a gear assembly mechanically connected to the blade assembly and the rotatable section of the bottom portion such that rotation of the rotatable section of the bottom portion rotates the blade assembly at a faster revolution rate than the rotation of the rotatable section of the bottom portion;
    wherein the rotatable section of the bottom portion includes a rolling wheel and is configured to be placed in contact with a rolling surface and rolled along the rolling surface, as the container is moved along the rolling surface without rotation, or to be rotated by hand to rotate the rotatable section and the blade assembly relative to the container; and
    wherein the rolling wheel has an inner surface and wherein the gear assembly includes a plurality of teeth on the inner surface of the rolling wheel and facing inward toward the shaft and operatively coupled to the shaft such that rotation of the rolling wheel rotates the shaft.

2. The blender of claim 1, wherein the outer surface of the roller wheel has a sufficiently larger diameter than the lower portion of the container, to allow an outer surface of the rotatable section to be placed in contact with the rolling surface and rolled along the rolling surface while the container is held out of contact with the rolling surface.

3. The blender of claim 1, wherein the rotatable section has a larger diameter than the lower portion of the container, such that an outer surface of the rotatable section extends radially outward a greater distance than the lower section of the container.

4. The blender of claim 1, wherein the rotatable section of the bottom portion has an outer surface for contacting the rolling surface, the outer surface of the rotatable section having a friction enhancing material or configuration on the roller wheel, for enhancing friction with the rolling surface when the outer surface of the rotatable section is placed in contact with the rolling surface.

5. The blender of claim 1, wherein the rotatable section of the bottom portion has an outer surface for contacting the rolling surface, the outer surface of the rotatable section having a friction enhancing material comprising a rubber or pliable plastic material on the outer surface of the roller wheel.

6. The blender of claim 1, wherein the bottom portion further comprises a fixed section connected to a lower portion of the container in a fixed relation to the container, wherein the rotatable section is coupled to the fixed section and rotatable with respect to the fixed section.

7. The blender of claim 1, wherein the blade assembly comprises a shaft to which the at least one blade is connected, the shaft being supported for rotation, and wherein the gear assembly is mechanically connected to the shaft for rotating the shaft.

8. The blender of claim 1, wherein the blade assembly comprises a plurality of blade subassemblies, each blade subassembly being arranged at a separate position relative to each other blade subassembly in a direction along a portion of an axis extending from the lower portion to the upper portion of the container.

9. The blender of claim 8, wherein each blade subassembly comprises a plurality of blade surfaces extending in a plurality of different directions relative to each other.

10. The blender of claim 1, wherein the blade assembly comprises a plurality of blade subassemblies, the plurality of blade subassemblies including a first blade subassembly, a second blade subassembly, and a third blade subassembly, the first blade subassembly is arranged closer to the lid than the second and third blade subassemblies, the second blade subassembly is arranged closer to the lid than the third blade subassembly.

11. The blender of claim 1, wherein the container has a shape having a generally polygonal cross-section taken perpendicular to an axial length dimension of the container.

12. A blender comprising:
a container;
a lid connected to an upper portion of the container;
a bottom portion connected to a lower portion of the container, the bottom portion comprising a rotatable section rotatable with respect to the container;
a blade assembly comprising at least one blade rotatably connected to the rotatable section of the bottom portion; and
a gear assembly mechanically connected to the blade assembly and the rotatable section of the bottom portion such that rotation of the rotatable section of the bottom portion rotates the blade assembly at a faster revolution rate than the rotation of the rotatable section of the bottom portion;
wherein the rotatable section of the bottom portion is configured to be placed in contact with a rolling surface and rolled along the rolling surface, as the container is moved along the rolling surface without rotation, to rotate the rotatable section and the blade assembly relative to the container;
wherein the bottom portion further comprises a fixed section connected to a lower portion of the container in a fixed relation to the container, wherein the rotatable section is coupled to the fixed section and rotatable with respect to the fixed section; and
wherein the fixed section includes a base having a bottom surface for supporting the blender in an upright orientation, when the bottom surface is placed on a flat surface.

13. The blender of claim 12, wherein the fixed section further includes a first section connected to the lower portion of the container, and wherein the rotatable section of the bottom portion is arranged between the first section and the base of the fixed section.

14. A blender comprising:
a container;
a lid connected to an upper portion of the container;
a bottom portion connected to a lower portion of the container, the bottom portion comprising a rotatable section rotatable with respect to the container;
a blade assembly comprising at least one blade rotatably connected to the rotatable section of the bottom portion; and
a gear assembly mechanically connected to the blade assembly and the rotatable section of the bottom portion such that rotation of the rotatable section of the bottom portion rotates the blade assembly at a faster revolution rate than the rotation of the rotatable section of the bottom portion;
wherein the rotatable section of the bottom portion is configured to be placed in contact with a rolling surface and rolled along the rolling surface, as the container is moved along the rolling surface without rotation, to rotate the rotatable section and the blade assembly relative to the container; and
wherein the gear assembly further comprises a rolling wheel having a plurality of teeth facing inward toward the shaft, a plurality of planetary gears, each of the plurality of planetary gears having a plurality of teeth, the planetary gears mounted within the circumference of the rolling wheel such that the teeth of each of the planetary gears engage with the teeth of the rolling wheel, and a shaft or sun gear mounted to the shaft, the shaft or sun gear having a plurality of teeth such that the teeth of the shaft or sun gear engage with the teeth of each of the planetary gears such that rotation of the rolling wheel rotates the shaft or sun gear and a single rotation of the rolling wheel causes multiple rotations of the shaft or sun gear.

15. The blender of claim 14, wherein a gear ratio between the rolling wheel and the shaft gear is within a range including and between 1:4 and 1:9.

16. A blender comprising:
a container;
a lid connected to an upper portion of the container;

a bottom portion connected to a lower portion of the container, the bottom portion comprising a rotatable section rotatable with respect to the container;
a blade assembly comprising at least one blade rotatably connected to the rotatable section of the bottom portion; and
a gear assembly mechanically connected to the blade assembly and the rotatable section of the bottom portion such that rotation of the rotatable section of the bottom portion rotates the blade assembly at a faster revolution rate than the rotation of the rotatable section of the bottom portion;
wherein the rotatable section of the bottom portion is configured to be placed in contact with a rolling surface and rolled along the rolling surface, as the container is moved along the rolling surface without rotation, to rotate the rotatable section and the blade assembly relative to the container;
wherein the blade assembly comprises a plurality of blade subassemblies, the plurality of blade subassemblies including a first blade subassembly, a second blade subassembly, and a third blade subassembly, the first blade subassembly is arranged closer to the lid than the second and third blade subassemblies, the second blade subassembly is arranged closer to the lid than the third blade subassembly; and
wherein the first blade subassembly comprises a plurality of blades oriented to pull material from the upper portion of the container toward the lower portion of the container and chop the material as the material passes the first blade subassembly, the second blade subassembly comprises a plurality of blades oriented to cut and shred material that has passed through the first blade subassembly, the third blade subassembly has a larger number of cutting surfaces than the second blade subassembly to more finely shred or liquefy material that has passed through the second blade subassembly.

17. A blender comprising;
a container;
a lid connected to an upper portion of the container;
a bottom portion connected to a lower portion of the container, the bottom portion comprising a rotatable section rotatable with respect to the container;
a blade assembly comprising at least one blade rotatably connected to the rotatable section of the bottom portion;
a gear assembly mechanically connected to the blade assembly and the rotatable section of the bottom portion such that rotation of the rotatable section of the bottom portion rotates the blade assembly at a faster revolution rate than the rotation of the rotatable section of the bottom portion; and
a strainer arranged in the container between the lid and the blade assembly, the strainer having a plurality of openings for straining a material, as the material is poured out from an upper portion of the container;
wherein the rotatable section of the bottom portion is configured to be placed in contact with a rolling surface and rolled along the rolling surface, as the container is moved along the rolling surface without rotation, to rotate the rotatable section and the blade assembly relative to the container.

18. A blender comprising:
a container;
a lid connected to a first end of the container;
a rotatable section connected to a second end of the container, the rotatable section being rotatable with respect to the container;
a blade assembly comprising at least one blade rotatably connected to the rotatable section; and
a gear assembly mechanically connected to the blade assembly and the rotatable section such that rotation of the rotatable section rotates the blade assembly at a faster revolution rate than the rotation of the rotatable section;
wherein the rotatable section includes a rolling wheel and is configured to be placed in contact with a rolling surface and rolled along the rolling surface, as the container is moved along the rolling surface without rotation, or rotated by hand to rotate the rotatable section and the blade assembly relative to the container; and
wherein the rolling wheel has an inner surface and wherein the gear assembly includes a plurality of teeth on the inner surface of the rolling wheel and facing inward toward the shaft and operatively coupled to the shaft such that rotation of the rolling wheel rotates the shaft.

19. A method of blending a material, the method comprising:
placing a material to be blended in a container;
connecting a lid to an upper portion of the container;
providing a rotatable section connected to a lower portion of the container, the rotatable section rotatable with respect to the container;
providing a blade assembly comprising at least one blade in connection for rotation with the rotatable section;
providing a gear assembly mechanically connected to the blade assembly and the rotatable section of the bottom portion such that rotation of the rotatable section of the bottom portion rotates the blade assembly at a faster revolution rate than the rotation of the rotatable section of the bottom portion; and
placing the rotatable section in contact with a rolling surface and rolling the rotatable section along the rolling surface, while moving the container along the rolling surface without rotation, to rotate the rotatable section and the blade assembly relative to the container, while the material is in the container.

* * * * *